(12) United States Patent
Wei et al.

(10) Patent No.: US 9,120,077 B2
(45) Date of Patent: Sep. 1, 2015

(54) SURFACE-COATED ZEOLITE MATERIALS FOR DIESEL OXIDATION APPLICATIONS

(75) Inventors: Xinyi Wei, Princeton, NJ (US); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 459 days.

(21) Appl. No.: 13/245,291

(22) Filed: Sep. 26, 2011

(65) Prior Publication Data

US 2012/0079817 A1    Apr. 5, 2012

Related U.S. Application Data

(60) Provisional application No. 61/388,728, filed on Oct. 1, 2010.

(51) Int. Cl.
| | |
|---|---|
| *B01D 53/94* | (2006.01) |
| *B01J 29/068* | (2006.01) |
| *F01N 3/035* | (2006.01) |
| *B01J 19/24* | (2006.01) |
| *B01J 23/44* | (2006.01) |
| *B01J 29/74* | (2006.01) |
| *B01J 35/04* | (2006.01) |

(Continued)

(52) U.S. Cl.
CPC ........... *B01J 19/2485* (2013.01); *B01D 53/944* (2013.01); *B01J 23/44* (2013.01); *B01J 29/7415* (2013.01); *B01J 35/04* (2013.01); *B01J 37/0036* (2013.01); *B01J 37/0045* (2013.01); *B01J 37/0221* (2013.01); *B01J 37/0242* (2013.01); *B01J 37/0244* (2013.01); *B01J 37/0246* (2013.01); *B01J 37/0248* (2013.01); *F01N 3/103* (2013.01); *B01D 2255/102* (2013.01); *B01D 2255/1021* (2013.01); *B01D 2255/1023* (2013.01); *B01D 2255/502* (2013.01); *B01D 2255/504* (2013.01); *B01D 2255/9202* (2013.01); *B01D 2258/012* (2013.01); *B01J 2219/2407* (2013.01); *B01J 2219/2428* (2013.01)

(58) Field of Classification Search
USPC ......................................... 422/168, 177, 180
See application file for complete search history.

(56) References Cited

U.S. PATENT DOCUMENTS

| | | | |
|---|---|---|---|
| 5,145,825 A | 9/1992 | Deeba et al. | |
| 5,582,003 A | 12/1996 | Patil et al. | |

(Continued)

FOREIGN PATENT DOCUMENTS

| | | |
|---|---|---|
| AU | 2006200894 | 3/2006 |
| EP | 0727567 | 8/1996 |

(Continued)

OTHER PUBLICATIONS

"International Search Report of PCT/US2011/053463", mailed on Apr. 27, 2012, 4 pgs.

(Continued)

*Primary Examiner* — Walter D Griffin
*Assistant Examiner* — Jelitza Perez
(74) *Attorney, Agent, or Firm* — Servilla Whitney LLC

(57) ABSTRACT

A diesel oxidation catalyst for the treatment of exhaust gas emissions, such as the oxidation of unburned hydrocarbons (HC) and carbon monoxide (CO) is described. Also described is a novel washcoat composition including a surface-coated zeolite coated with at least one of zirconia and alumina, and a platinum group metal supported on a high surface area alumina.

14 Claims, 5 Drawing Sheets

(51) Int. Cl.
  *B01J 37/00*  (2006.01)
  *B01J 37/02*  (2006.01)
  *F01N 3/10*  (2006.01)

(56) References Cited

U.S. PATENT DOCUMENTS

| | | |
|---|---|---|
| 6,444,610 B1 | 9/2002 | Yamamoto |
| 6,503,862 B1 | 1/2003 | Yamamoto |
| 6,518,213 B1 | 2/2003 | Yamamoto et al. |
| 6,589,901 B2 | 7/2003 | Yamamoto et al. |
| 6,617,276 B1 | 9/2003 | Ballinger et al. |
| 6,632,768 B2 | 10/2003 | Loyalka et al. |
| 7,576,031 B2 | 8/2009 | Beutel et al. |
| 2007/0104623 A1* | 5/2007 | Dettling et al. ............... 422/177 |

FOREIGN PATENT DOCUMENTS

| | | |
|---|---|---|
| EP | 1839747 | 10/2007 |
| JP | 2006035130 | 9/2006 |
| WO | WO-99/56859 | 11/1999 |

OTHER PUBLICATIONS

"IPRP of PCT/US2011/053463", issued on Apr. 2, 2013, 6 pgs.
"Written Opinion of PCT/US2011/053463", mailed on Apr. 27, 2012, 5 pgs.

* cited by examiner

SURFACE-COATED ZEOLITE MATERIALS FOR DIESEL OXIDATION APPLICATIONS

CROSS-REFERENCE TO RELATED APPLICATIONS

This application claims priority under 35 U.S.C. §119(e) to U.S. Provisional Application No. 61/388,728, filed Oct. 1, 2010, the disclosure of which is hereby incorporated by reference in its entirety.

FIELD OF THE INVENTION

Embodiments of the present invention are directed to diesel oxidation catalysts and methods for their manufacture. More specifically, embodiments of the present invention are directed to diesel oxidation catalysts comprising at least one washcoat layer including a surface-coated zeolite.

BACKGROUND OF THE INVENTION

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others. NO is of concern because it is believed to undergo a process known as photo-chemical smog formation, through a series of reactions in the presence of sunlight and hydrocarbons, and is significant contributor to acid rain. $NO_2$ on the other hand has a high potential as an oxidant and is a strong lung irritant. Particulates (PM) are also connected to respiratory problems. As engine operation modifications are made to reduce particulates and unburned hydrocarbons on diesel engines, the $NO_x$ emissions tend to increase.

Oxidation catalysts comprising a precious metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a Diesel-powered engine to treat the exhaust before it vents to the atmosphere. Typically, the diesel oxidation catalysts are formed on ceramic or metallic substrate carriers (such as the flow-through monolith carrier, as described below) upon which one or more catalyst coating compositions are deposited. In addition to the conversions of gaseous HC, CO and the SOF fraction of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a zeolite, may be provided as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

Although platinum (Pt) remains the most effective platinum group metal for oxidizing CO and HC in a DOC, after high temperature aging under lean conditions, the use of other platinum group metals such as palladium (Pd) may be warranted to achieve benefits in cost, performance, and stability. There is a continuing need to provide DOC catalysts whose active ingredients such as platinum group metals are used efficiently while ensuring stability and cost-effectiveness.

SUMMARY OF THE INVENTION

Provided are catalytic articles and methods of making and using the same. The catalytic articles treat an exhaust gas stream containing hydrocarbons, CO and particulate matter. The catalytic article comprises a substrate having an inlet end and an outlet end defining an axial length, the substrate coated with at least one washcoat layer comprising a surface-coated zeolite coated with one or more of zirconia and alumina, and a platinum group metal supported on at least one of the surface coated zeolite and a high surface area refractory metal oxide. In one embodiment, the surface-coated zeolite has a surface coating of one or more of zirconia and alumina up to about 40 weight %. In a detailed embodiment, the zeolite comprises a beta-zeolite, Y-zeolite or ZSM-5. One or more embodiments provide that the surface-coated zeolite has an average particle size which is greater than an average particle size of a similar zeolite without the surface coating. A detailed embodiment of the surface-coated zeolite has a mean particle size in the range of about 3 µm to about 50 µm. Other embodiments provide that the surface-coated zeolite has a particle size in the range of about 15 µm to about 25 µm. The zeolite surface can be coated by one or more of an incipient wetness process or a spray-drying process. Specific embodiments provide that the washcoat layer has a greater porosity than a washcoat layer made with a similar zeolite without the surface coating.

Other embodiments provide that the high surface area refractory metal oxide comprises alumina and the platinum group metal supported comprises one or more of platinum and palladium.

The substrate of a specific embodiment comprises a flow-through substrate having a plurality of longitudinally extending passages formed by longitudinally extending walls bounding and defining said passages. Alternatively, the substrate can be a wall-flow filter having gas permeable walls formed into a plurality of axially extending channels, each channel having one end plugged with any pair of adjacent channels plugged at opposite ends thereof.

Other aspects of the invention include emissions treatment systems that comprise: a diesel engine emitting an exhaust stream including hydrocarbons, CO and particulate matter; and the catalytic articles provided herein positioned downstream of and in flow communication with the diesel engine.

Another aspect provided is a method of making a catalytic article comprising: coating a zeolite with at least one of zirconia and alumina to provide a surface-coated zeolite; drying and calcining the surface-coated zeolite; preparing a slurry of the dried and calcined surface-coated zeolite; slurry coating a substrate with at least one washcoat layer containing the surface-coated zeolite; and drying and calcining the slurry coated substrate. The step in the method of the coating the zeolite can comprise preparing a slurry of the zeolite with at least one of a soluble zirconia precursor and a soluble alumina precursor; and spray drying the slurry containing the zeolite and at least one of the soluble zirconia precursor and soluble alumina precursor. Alternatively, coating the zeolite can comprise impregnating a zeolite with at least one of a soluble zirconia precursor and a soluble alumina precursor by an incipient wetness process.

A detailed embodiment provides that the zeolite precursor comprises zirconium acetate and the alumina precursor comprises boehmite.

The method can further comprise impregnating at least a high surface area refractory metal oxide with a platinum group metal to from an impregnated high surface area refractory metal oxide; and drying and calcining the impregnated high surface area refractory metal oxide, and the slurry includes the dried and calcined surface-coated zeolite and the dried and calcined impregnated high surface area alumina;

DETAILED DESCRIPTION OF THE INVENTION

Figure 1:
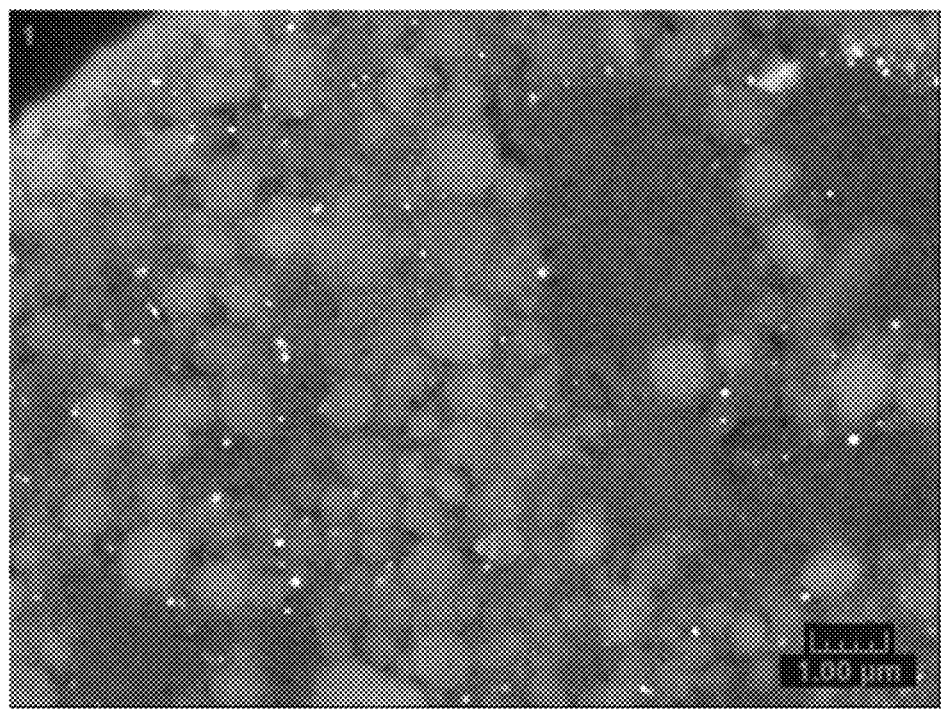
FIG. 1 is a scanning electron micrograph image of a washcoat containing H-Beta zeolite.

Provided are catalytic articles for treating an exhaust gas stream containing hydrocarbons, CO and particulate matter, where a washcoat layer on a substrate comprises a surface-coated zeolite coated with one or more of zirconia and alumina, and a platinum group metal supported on at least one of the surface coated zeolite and a high surface area refractory metal oxide. According to one or more embodiments, catalytic materials may be disposed on a monolithic substrate in the form of one or more washcoat layers.

Platinum (Pt) remains the most effective platinum group metal for oxidizing CO and HC in a DOC, after high temperature aging under lean conditions and in the presence of fuel sulfur. Nevertheless, Pd-incorporated catalysts offer advantages in stabilizing Pt at higher temperature aging (>700° C.) and in lowering catalyst cost. Pd-based DOCs, however, typically show higher light-off temperatures for oxidation of CO and HC, especially when used with HC storage materials, potentially causing a delay in HC and or CO light-off. Moreover, Pt-based catalysts become sensitive to zeolites when Pd is added. That is, the ability of Pt to convert paraffins and/or oxidize NO is impeded in the presence of Pd and zeolite. The surface coated zeolites provided herein are desirable to improve upon one or more of the aforementioned limitations.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the terms "exhaust stream" and "engine exhaust stream" refer to the engine out effluent as well as to the effluent downstream of one or more other catalyst system components including but not limited to a diesel oxidation catalyst and/or soot filter.

The following terms shall have, for the purposes of this application, the respective meanings set forth below.

"Refractory metal oxides" refer to alumina, silica, zirconia, titania, ceria, and physical mixtures or chemical combinations thereof, including atomically doped combinations.

"Platinum group metal components" refer to platinum group metals or one of their oxides.

"Rare earth metal components" refer to one or more oxides of the lanthanum series defined in the Periodic Table of Elements, including lanthanum, cerium, praseodymium and neodymium.

"Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated. As used herein and as described in Heck, Ronald and Robert Farrauto, *Catalytic Air Pollution Control*, New York: Wiley-Interscience, 2002, pp. 18-19, a washcoat layer includes a compositionally distinct layer of material disposed on the surface of the monolithic substrate or an underlying washcoat layer. A catalytic article can contain one or more washcoat layers, and each washcoat layer can have unique chemical catalytic functions.

"Flow communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relate to another component.

Figure 2:
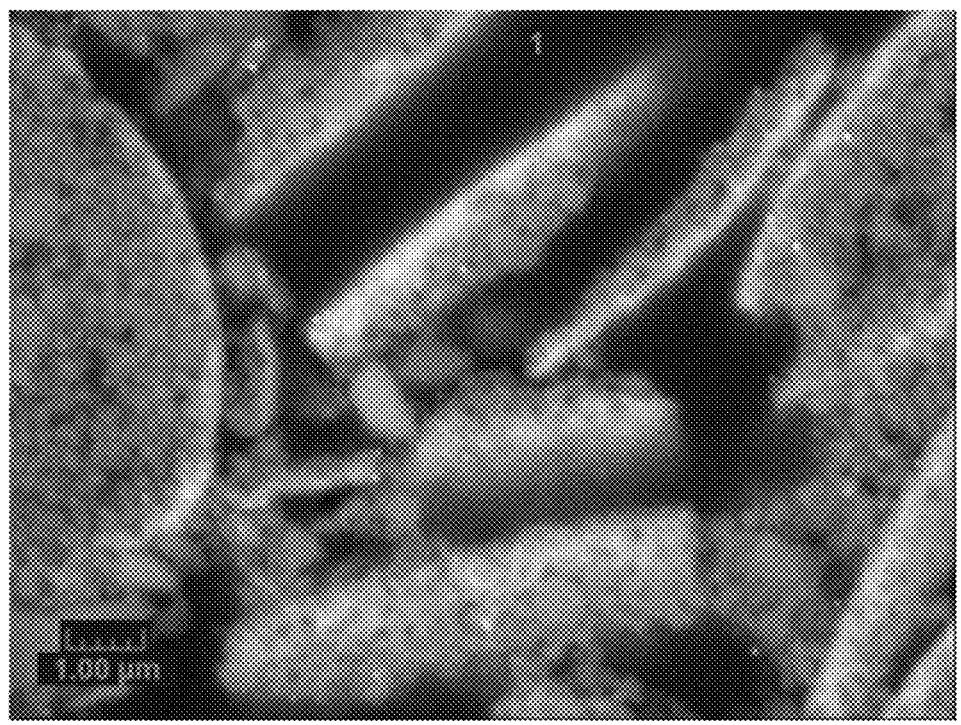
FIG. 2 is a scanning electron micrograph image of a washcoat containing 10% $ZrO_2$—H-Beta zeolite.

Zeolite materials, a specific example being beta-zeolite, serve as hydrocarbon traps in diesel oxidation catalysts. Zeolites are useful in improving the light-off performance by trapping cold-start hydrocarbon species at lower temperature and releasing them at higher temperature when catalysts become active. However, zeolites can also impose negative effects on diesel oxidation catalysts, such as poisoning platinum group metal function with volatile SiO species (a common impurity) and, particularly for beta-zeolite which has very small particles, which significantly reduces the washcoat porosity. While not wishing to be bound by theory, according to embodiments of the invention a process for making and using a beta-zeolite material surface coated with at least one of zirconia ($ZrO_2$) and alumina ($Al_2O_3$) is provided to both shield the negative interaction between zeolite and the platinum group metal and to increase washcoat porosity by agglomerating small zeolite particles via binding zirconia or alumina. FIG. 1 is a scanning electron micrograph image of a washcoat containing H-Beta zeolite and FIG. 2 is a scanning electron micrograph image of a washcoat containing 10% ZrO2-H-Beta zeolite. FIG. 2 has a surface-coated zeolite, which has increased porosity relative to FIG. 1 and its uncoated zeolite.

It has been demonstrated that beta-zeolite exhibits poisoning effect to palladium when samples experience high temperature hydrothermal aging in the vicinity of each other. Without being bound by any particular theory, it is believed that this is due to additional palladium sintering induced by volatile SiO species. Although platinum is inert to Si poisoning, the negative effect of beta-zeolite remains for the bimetallic Pt—Pd catalysts when Pt:Pd wt/wt ratio is <10. In one or more embodiments, therefore the Pt:Pd ratio is in the range of 0:1-10:1.

Figure 3:
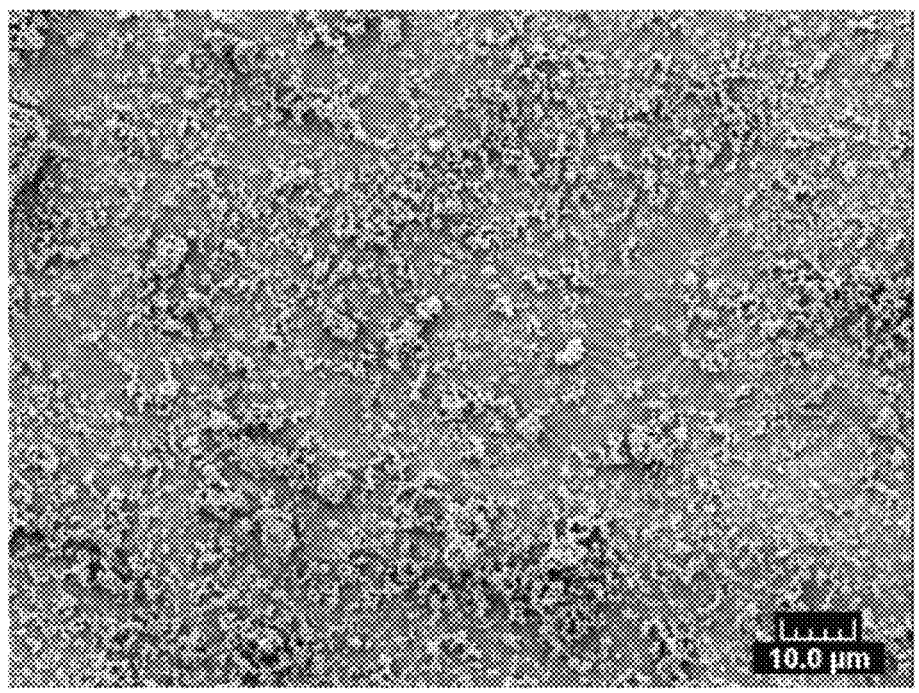
FIG. 3 is a scanning electron micrograph image of an uncoated H-Beta zeolite.
Figure 4:
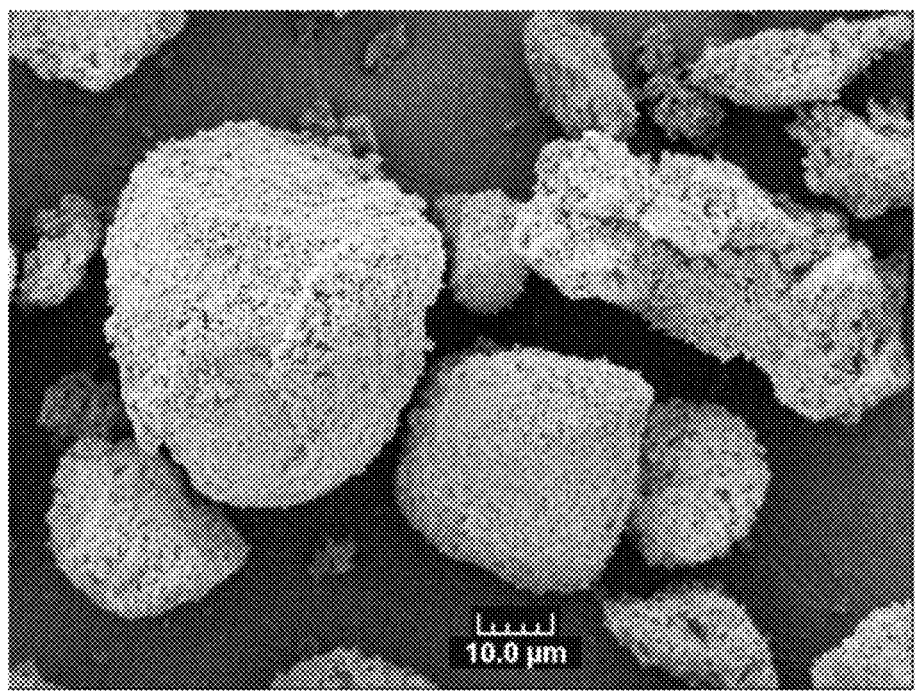
FIG. 4 is a scanning electron micrograph image of an H-Beta zeolite coated with 10% zirconia in accordance with one or more embodiments of the invention.

On the other hand, it has been observed that zirconia surface has a strong affinity for Si and it is believed that zirconia could capture significant amounts of volatile Si from zeolite during hydrothermal aging. As such, it is believed that coating a layer of zirconia material onto the zeolite particle surface could alleviate Si poisoning effects. Additionally, the zirconia layer may bind small zeolite particles together and significantly reduce fines and improve washcoat porosity. FIG. 3 shows a scanning electron micrograph (SEM) image of H-Beta zeolite particles. It can be seen that the particles are generally smaller than 1 μm in diameter. FIG. 4 shows a SEM image of H-Beta zeolite which has been surface-coated with about 10% zirconia via impregnation. Both FIGS. 3 and 4 are shown on comparable scales. It can be easily seen that the small zeolite particles observed in FIG. 3 can be agglomerated into large particles as shown in FIG. 4.

Another surface binding material which may be useful with embodiments of the invention is a refractory metal oxide such as alumina. Without being bound by any particular theory of operation, it is believed that alumina also has an affinity to Si and therefore provides a shielding layer between the platinum group metal and the zeolite.

Figure 5:
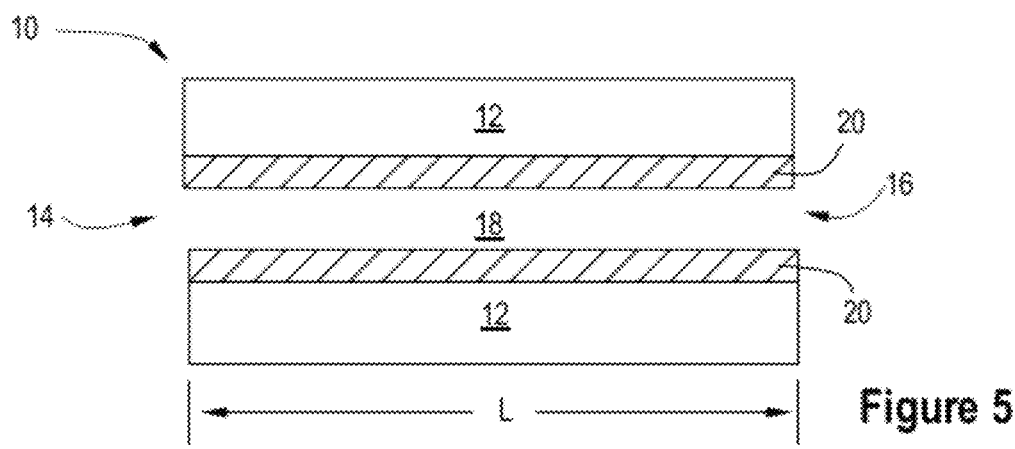
FIG. 5 is a schematic view of a channel a catalytic article in accordance with one or more embodiments of the invention.

Turning to FIG. 5, one or more embodiments of the invention are directed to catalytic articles 10 (also referred to herein as "oxidation catalysts" and "diesel oxidation catalysts") for treating an exhaust gas stream containing hydrocarbons, carbon monoxide (CO) and particulate matter. A catalytic article 10 comprises a substrate 12, often referred to as a carrier or carrier substrate. The substrate 12 has an inlet end 14 and an outlet end 16 defining an axial length L. The substrate 12 generally has a plurality of channels 18, of which only one is shown for clarity. The substrate 12 is coated with at least one washcoat layer 20 including a surface-coated zeolite. The surface-coated zeolite is coated with one or more of zirconia and alumina. The washcoat layer 20 also has a platinum group metal supported on a high surface area alumina.

The platinum group metal of some embodiments includes one or more of platinum, palladium, rhodium, ruthenium, osmium and iridium. In detailed embodiments, the platinum group metal is one or more of palladium, platinum and combinations thereof. In specific embodiments, the platinum group metal includes platinum, either alone or in combination with other platinum group metals. In some embodiments, the platinum group metal is supported on the high surface area refractory metal oxide, for example, alumina.

The zeolite in the catalytic article can be any suitable zeolite. In specific embodiments, the zeolite comprises one or more of a beta-zeolite, Y-zeolite or ZSM-5. In detailed embodiments, the zeolite is a beta-zeolite.

In detailed embodiments has a surface coating of zirconia and/or alumina up to about 40 weight %. In some embodiments, the surface coating of zirconia and/or alumina is up to about 20 weight %. In various embodiments, the surface of the zeolite is coated up to about 5%, 10%, 15%, 20%, 25%, 30%, 35%, 40%, 45% or 50%.

As has been discussed with respect for FIGS. 1-4, the zeolite particles may be agglomerated as a result of the surface coating. In some embodiments, the surface-coated zeolite has an average particle size which is greater than the average particle size of a similar zeolite without the surface coating. In detailed embodiments, the surface-coated zeolite has a mean particle size in the range of about 3 μm to about 50 μm. In specific embodiments, the surface-coated zeolite has a mean particle size in the range of about 10 μm to about 30 μm; or even 15 μm to about 25 μm. In various embodiments, the surface-coated zeolite has a mean particle size greater than about 10 μm, 15 μm, 20 μm, 25 μm, or even 30 μm.

The surface-coated zeolite creates a different washcoat porosity as compared to an uncoated zeolite. In some embodiments, as shown by FIGS. 1 and 2, the washcoat having a surface-coated zeolite (FIG. 2) has a greater porosity than a washcoat made with a similar zeolite without the surface coating (FIG. 1).

Diesel Oxidation Catalyst

Catalyst compositions include platinum group metal- and base metal-based compositions. The catalyst compositions according to one or more embodiments can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. If possible, the oxidation catalyst removes some of the particulate matter from the exhaust stream upstream of the filter, since the reduction in the particulate mass on the filter potentially extends the time before forced regenerations.

One specific oxidation catalyst composition that may be used in the emission treatment system contains a platinum group component (e.g., platinum and palladium) dispersed on a high surface area, refractory oxide support (e.g., gamma-alumina) which is combined with a zeolite component (for example, a beta zeolite). In a specific embodiment, the platinum group metal component is platinum. In another embodiment, the platinum group metal comprises both platinum and palladium. When the composition is disposed on a refractory oxide substrate, e.g., a flow through honeycomb substrate, the concentration of platinum group metal is typically from about 10 to 200 g/ft$^3$, 30 to 150 g/ft$^3$, or even 50 to 120 g/ft$^3$.

The Substrate

According to one or more embodiments, the substrate for the catalyst may be any of those materials typically used for preparing automotive catalysts and will typically comprise a metal or ceramic honeycomb structure. Any suitable substrate may be employed, such as a monolithic flow-through substrate and having a plurality of fine, parallel gas flow passages extending from an inlet to an outlet face of the substrate, such that passages are open to fluid flow. The passages, which are essentially straight paths from their fluid inlet to their fluid outlet, are defined by walls on which the catalytic material is coated as a "washcoat" so that the gases flowing through the passages contact the catalytic material. The flow passages of the monolithic substrate are thin-walled channels which can be of any suitable cross-sectional shape such as trapezoidal, rectangular, square, sinusoidal, hexagonal, oval, circular, etc. Such structures may contain from about 60 to about 1200 or more gas inlet openings (i.e., "cells") per square inch of cross section (cpsi). A representative commercially-available flow-through substrate is the Corning 400/6 cordierite material, which is constructed from cordierite and has 400 cpsi and wall thickness of 6 mil. However, it will be understood that the invention is not limited to a particular substrate type, material, or geometry.

Ceramic substrates may be made of any suitable or ceramic or metallic material. Exemplary ceramic materials include but are not limited to: cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

Exemplary metallic supports include the heat resistant metals and metal alloys such as titanium and stainless steel as well as other alloys in which iron is a substantial or major component.

Figure 6:
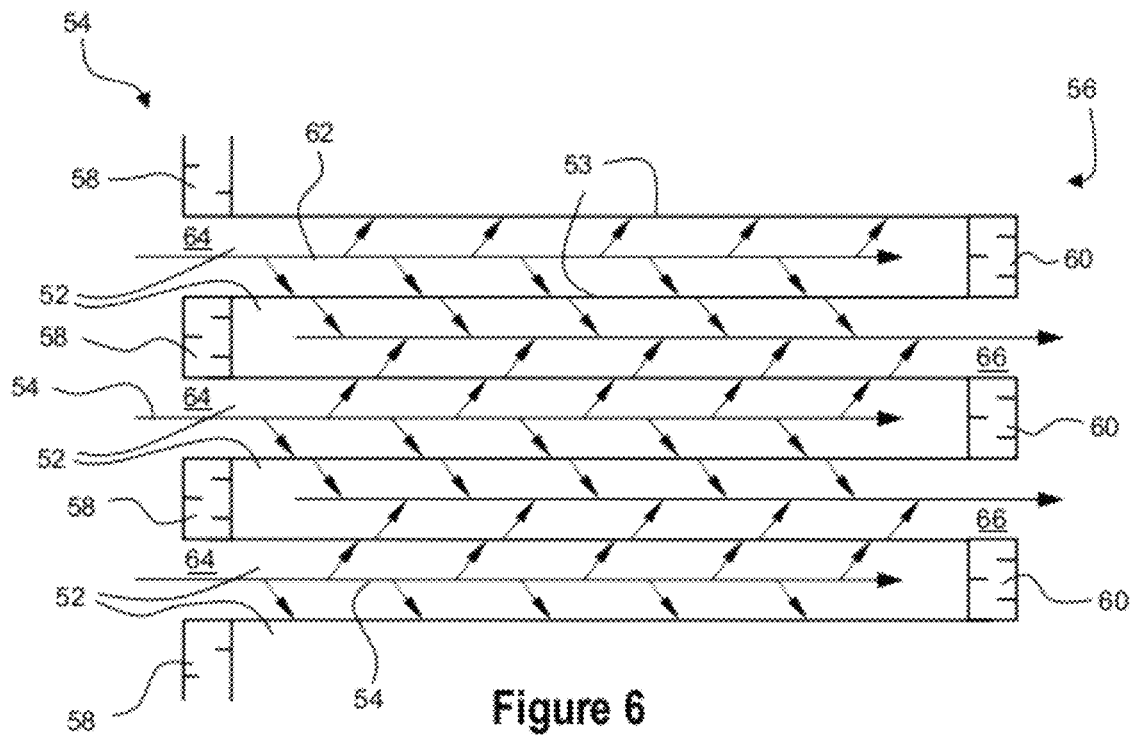
FIG. 6 is a partial cross-sectional view of a wall flow monolith for use with one or more embodiments of the invention.
Figure 7:
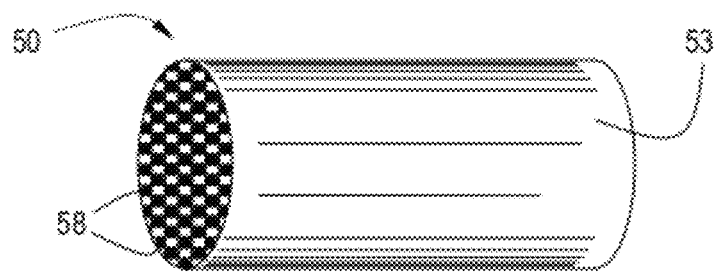
FIG. 7 is a perspective view of a wall flow monolith in accordance with one or more embodiments of the invention.

FIGS. 6 and 7 illustrate a wall flow filter substrate 50 which has a plurality of alternately blocked channels 52 and can serve as a particulate filter. The passages are tubularly enclosed by the internal walls 53 of the filter substrate. The substrate has an inlet end 54 and an outlet end 56. Alternate passages are plugged at the inlet end 54 with inlet plugs 58 and at the outlet end 56 with outlet plugs to form opposing checkerboard patterns at the inlet 54 and outlet 56. A gas stream 62 enters through the unplugged channel inlet 64, is stopped by outlet plug 60, and diffuses through channel walls 53 (which are porous) to the outlet side. 66 The gas cannot pass back to the inlet side of walls because of inlet plugs 58. If such substrate is utilized, the resulting system will be able to remove particulate matters along with gaseous pollutants.

Typical wall flow filters in commercial use are typically formed with lower wall porosities, e.g., from about 35% to 50%, than the wall flow filters utilized in the invention. In general, the pore size distribution of commercial wall flow filters is typically very broad with a mean pore size smaller than 17 microns.

Method of Preparing a Catalyst

One or more embodiments of the invention are directed to methods of making a catalytic article. A zeolite surface is coated with at least one of zirconia and alumina to provide a surface-coated zeolite. The surface-coated zeolite is dried and calcined. A high surface area refractory metal oxide such as alumina is impregnated with one or more platinum group metals, dried and calcined. A slurry of the dried and calcined impregnated surface-coated zeolite with the dried and calcined impregnated high surface area refractory metal oxide is prepared and a substrate is coated with at least one washcoat layer containing the impregnated surface-coated zeolite and impregnated alumina. The platinum group metal may be supported on the surface-coated zeolite. The slurry coated substrate is then dried and calcined.

Figure 8:
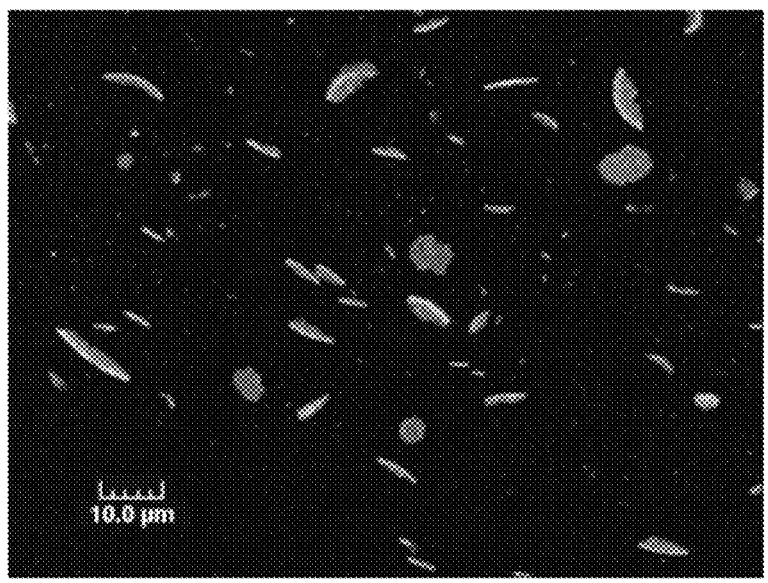
FIG. 8 is a scanning electron micrograph image of a spray-dried preparation of a catalyst in accordance with one more embodiments of the invention.

The surface-coated zeolite materials may be prepared via either incipient wetness impregnation of zeolite or by spray-drying mixed zeolite slurry. When impregnation method is used, the zeolite is impregnated with a zirconia acetate precursor solution or a dispersed boehmite solution, followed with drying and calcination. When spray-drying method is used, the zirconia acetate precursor or a dispersed boehmite solution is added to a zeolite slurry. Different preparation methods would result in distinctively different particle morphology. Spray-dried materials, as shown in FIG. 8, have particles as broken spheres which leads to higher washcoat porosity.

In detailed embodiments, the zeolite surface is coated by incipient wetness process using a zirconia acetate precursor solution or a dispersed boehmite solution. In specific embodiments, the zeolite surface is coated by spray-drying using a zirconia acetate precursor solution or a dispersed boehmite solution.

Emissions Treatment System

Figure 9:
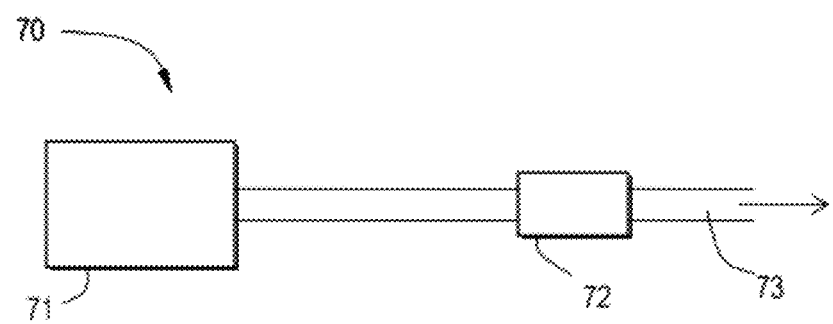
FIG. 9 shows an emissions treatment system in accordance with one or more embodiments of the invention.

With reference to FIG. 9, additional embodiments of the invention are directed to emissions treatment systems 70. One or more embodiments of the system 70 comprise a diesel engine 71 emitting an exhaust stream including hydrocarbons, CO and particulate matter. A diesel oxidation catalyst article 72, or substrate, is positioned downstream of and in flow communication with the diesel engine 71. The substrate 72 has an inlet end and an outlet end defining an axial length. The substrate 72 has at least one washcoat layer including a surface-coated zeolite coated with one or more of zirconia and alumina, and a platinum group metal coated on a high surface area alumina. The exhaust gas stream exiting the diesel engine 71 passes through the diesel oxidation catalyst article 72 where the $NO_x$, CO and hydrocarbons are oxidized. The exhaust stream exiting the diesel oxidation catalyst can then exit the treatment system 70 through, for example, the tailpipe 73 and be expelled to the atmosphere.

EXAMPLES

Comparative Example A

Comparative Example A is a single layer catalyst containing about 17% zeolite and about 83% alumina. Platinum and palladium precursor solutions were mixed together and co-impregnated on the alumina support and fixed via calcination at about 450° C. for one hour. The Pt—Pd impregnated alumina powder was then slurried and milled to a desired particle size ($D_{90}$<15 μm) and mixed with separately milled beta-zeolite ($D_{90}$<15 μm). The mixture was then coated onto a wall flow monolith. The total washcoat loading was about 1.3 g/in$^3$. The total PGM loading is 70 g/ft$^3$ with Pt/Pd weight ratio at 2.

Example B

A beta-zeolite was surface-coated with about 5% $ZrO_2$ via spray drying. The agglomerated particle size of surface-coated zeolite was 15-25 μm after spray-drying. The sample preparation was the same as that of Comparative Example A.

Figure 10:
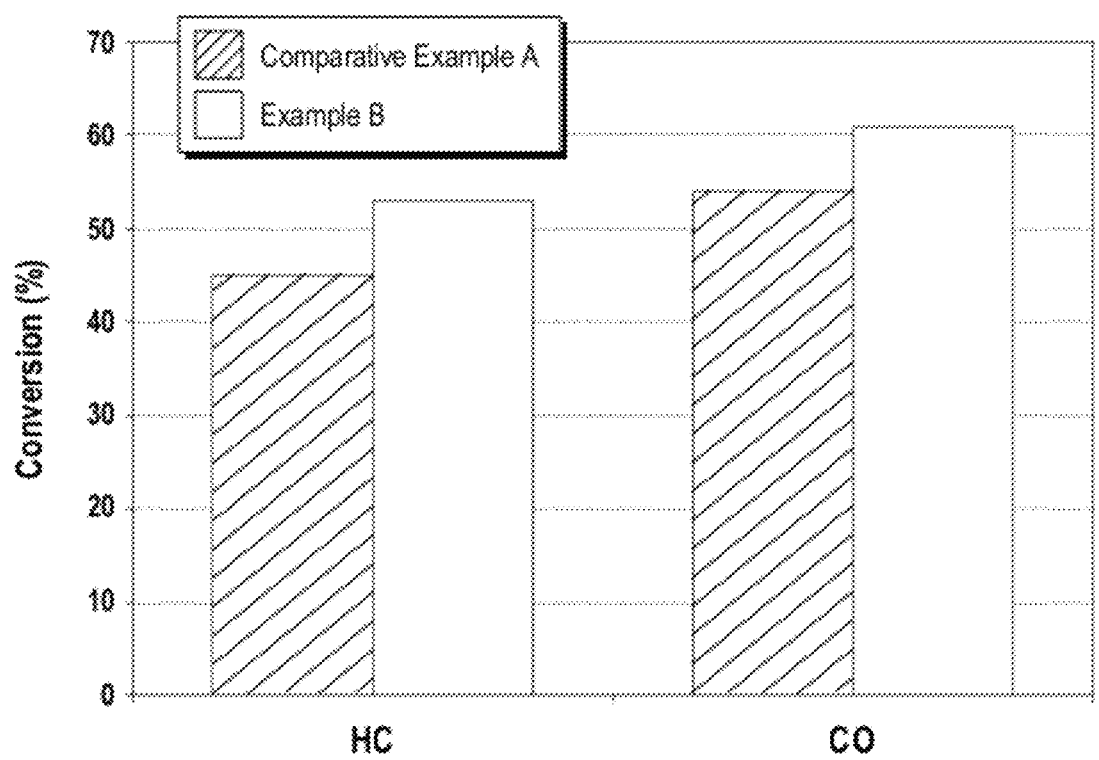
FIG. 10 shows a graph of the hydrocarbon and carbon monoxide conversions for various sample preparations.

FIG. 10 shows the conversion efficiencies of Comparative Example A and Example B for hydrocarbons and carbon monoxide. It can be seen that the addition of zirconia to the surface of the zeolite in Example B resulted in an increase in the conversion percentages of greater than about 5% for both components. These samples were engine aged at 750° C. for 20 hours, and evaluated on a lab reactor using a simulated transient test cycle.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A catalytic article for treating an exhaust gas stream containing hydrocarbons, CO and particulate matter, the article comprising a substrate having an inlet end and an outlet end defining an axial length, the substrate coated with at least one washcoat layer formed from a washcoat composition comprising a spray-dried surface-coated zeolite surface-coated with one or more of zirconia and alumina, and a platinum group metal supported on at least one of the surface-coated zeolite and a high surface area refractory metal oxide.

2. The catalytic article of claim 1, wherein the surface-coated zeolite has a surface coating of one or more of zirconia and alumina up to about 40 weight %.

3. The catalytic article of claim 1, wherein the zeolite comprises a beta-zeolite, Y-zeolite or ZSM-5.

4. The catalytic article of claim 1, wherein the surface-coated zeolite has an average agglomerated particle size which is greater than an average particle size of a similar zeolite without the surface coating.

5. The catalytic article of claim 1, wherein the surface-coated zeolite has a mean agglomerated particle size in the range of about 3 μm to about 50 μm.

6. The catalytic article of claim 1, wherein the surface-coated zeolite has an agglomerated particle size in the range of about 15 μm to about 25 μm.

7. The catalytic article of claim 1, wherein the washcoat layer has a greater porosity than a washcoat layer made with a similar zeolite without the surface coating.

8. The catalytic article of claim 1, wherein the high surface area refractory metal oxide comprises alumina and the platinum group metal supported comprises one or more of platinum and palladium.

9. The catalytic article of claim 1, wherein the substrate is a flow-through substrate having a plurality of longitudinally extending passages formed by longitudinally extending walls bounding and defining said passages.

10. The catalytic article of claim 1, wherein the substrate is a wall-flow filter having gas permeable walls formed into a plurality of axially extending channels, each channel having one end plugged with any pair of adjacent channels plugged at opposite ends thereof.

11. An emissions treatment system comprising:
a diesel engine emitting an exhaust stream including hydrocarbons, CO and particulate matter; and
the catalytic article of claim 1 positioned downstream of and in flow communication with the diesel engine.

12. The emissions treatment system of claim 11, wherein the zeolite has a surface coating of zirconia and/or alumina of up to about 40 weight %.

13. The emissions treatments system of claim 11, wherein the surface-coated zeolite has a mean agglomerated particle size in the range of about 3 μm to about 50 μm.

14. The emissions treatment system of claim 11, wherein the zeolite is a beta-zeolite, Y-zeolite or ZSM-5 zeolite.

* * * * *